(12) United States Patent
Schratt et al.

(10) Patent No.: US 7,287,953 B2
(45) Date of Patent: Oct. 30, 2007

(54) METHOD FOR LOADING AND UNLOADING

(75) Inventors: Dietmar Schratt, Vienna (AT); Helmut Klaus Schimany, Vienna (AT)

(73) Assignee: Rail Cargo Austria AG, Wien (AT)

( * ) Notice: Subject to any disclaimer, the term of this patent is extended or adjusted under 35 U.S.C. 154(b) by 6 days.

(21) Appl. No.: 10/527,017

(22) PCT Filed: Sep. 9, 2003

(86) PCT No.: PCT/AT03/00263

§ 371 (c)(1),
(2), (4) Date: Mar. 7, 2005

(87) PCT Pub. No.: WO2004/024605

PCT Pub. Date: Mar. 25, 2004

(65) Prior Publication Data

US 2005/0244254 A1    Nov. 3, 2005

(30) Foreign Application Priority Data

Sep. 11, 2002  (AT) ............................ A 1359/2002

(51) Int. Cl.
*B65G 65/00* (2006.01)
(52) U.S. Cl. ...................... 414/807; 414/277; 414/809
(58) Field of Classification Search ................ 414/807, 414/809, 277
See application file for complete search history.

(56) References Cited

U.S. PATENT DOCUMENTS

| | | | |
|---|---|---|---|
| 3,669,206 A * | 6/1972 | Tax et al. .................... | 180/168 |
| 3,828,940 A * | 8/1974 | Cooper ........................ | 212/308 |
| 3,836,020 A | 9/1974 | Lassig | |
| 4,106,639 A * | 8/1978 | Montgomery et al. ... | 414/141.3 |
| 4,973,219 A * | 11/1990 | Brickner et al. ......... | 414/792.9 |
| 5,421,688 A * | 6/1995 | Fuchtey et al. ............. | 414/392 |

(Continued)

FOREIGN PATENT DOCUMENTS

DE    33 39 092 A1    1/1985

(Continued)

*Primary Examiner*—Thomas J. Brahan
(74) *Attorney, Agent, or Firm*—Henry M. Feiereisen; Ursula B. Day

(57) ABSTRACT

Method for loading and unloading long-distance transportation means (1, 2) and for temporarily storing a standardized cargo (18) in an intermediate storage facility (3) includes a rail-guided hoist (5) with gripper (8). The cargo is lifted from a long-distance transportation means (1) and transferred to a transfer zone (4), lowered and set down. The cargo (18) is then transferred to an intermediate storage facility (3) and stored therein, then removed, transferred to a predetermined location in the transfer zone (4), and lowered and deposited onto a rail-guided long-distance transportation means (2) by the hoist (5). In the transfer area (4), the cargo (18) is lifted by another hoist (11) for movement to the predetermined location in the intermediate storage facility (3), and set down, whereupon the rail-guided long-distance vehicle (2) is loaded by moving the other hoist (11) to a predetermined location in the intermediate storage facility (3), and by lifting the cargo (18) via a shiftable and/or telescopic arm (13), withdrawing the cargo from the intermediate storage facility (3), and moving the cargo to a predetermined location in the transfer zone (4). The cargo (18) is then set down in the transfer area, lifted by the hoist (5), moved above the long-distance transportation means (2) and set down.

17 Claims, 1 Drawing Sheet

U.S. PATENT DOCUMENTS

| | | | |
|---|---|---|---|
| 5,505,585 A * | 4/1996 | Hubbard | 414/803 |
| 5,511,923 A * | 4/1996 | Dunstan | 414/139.9 |
| 5,540,532 A * | 7/1996 | Carder et al. | 414/284 |
| 5,609,460 A * | 3/1997 | Abel et al. | 414/334 |
| 5,953,234 A * | 9/1999 | Singer et al. | 700/214 |
| 6,698,990 B1 * | 3/2004 | Dobner et al. | 414/139.9 |

FOREIGN PATENT DOCUMENTS

| | | |
|---|---|---|
| DE | 195 21 020 A | 12/1996 |
| DE | 100 02 915 A1 | 8/2001 |
| DE | 100 33 141 A1 | 1/2002 |
| DE | 100 54 468 A1 | 5/2002 |
| EP | 0 599 841 B1 | 5/1995 |
| EP | 0 768 256 A1 | 4/1997 |
| WO | WO95/31396 | 11/1995 |
| WO | WO98/35891 A | 8/1998 |
| WO | WO99/10258 | 3/1999 |
| WO | WO 01/46061 A | 6/2001 |

* cited by examiner

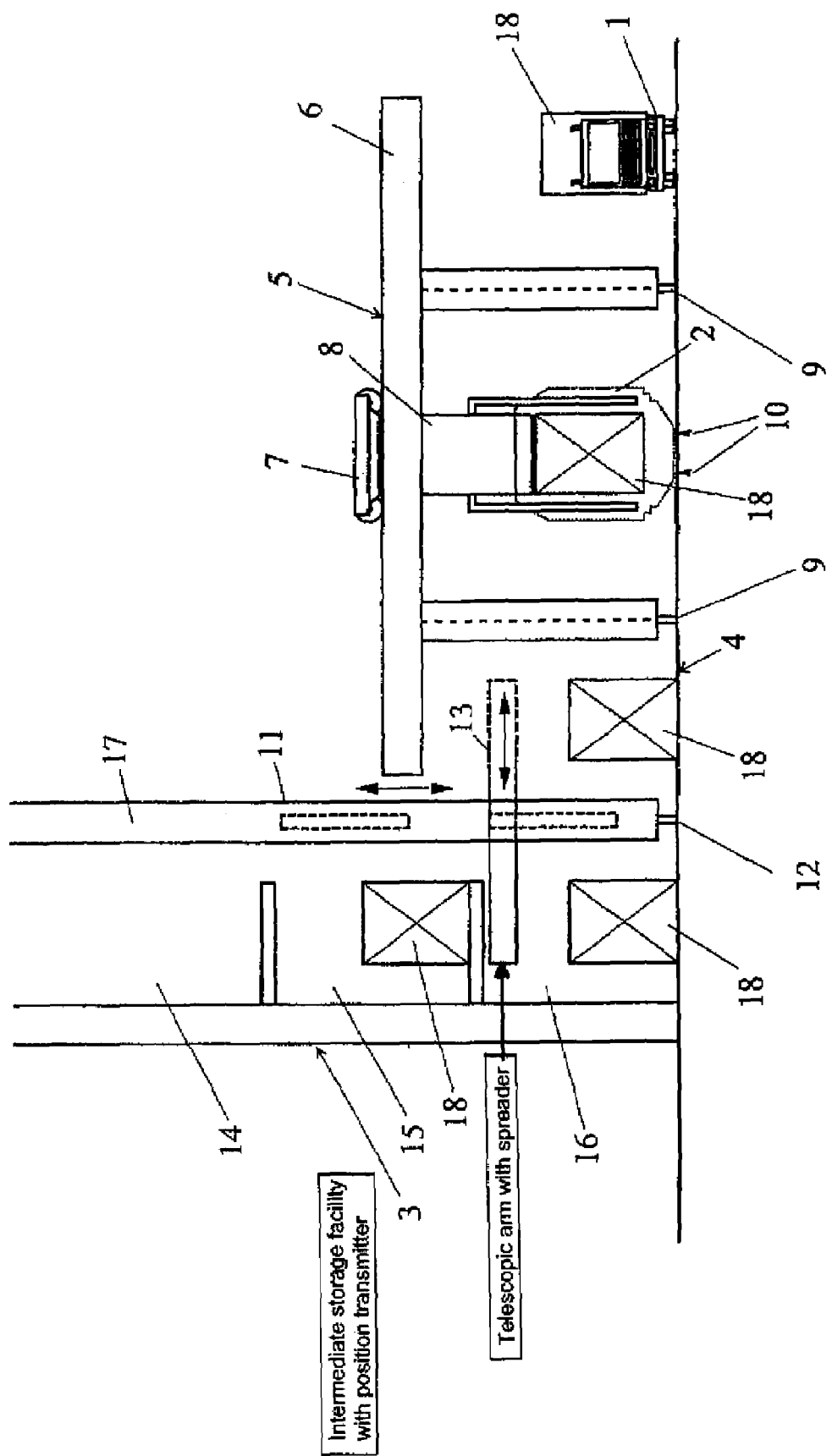

METHOD FOR LOADING AND UNLOADING

BACKGROUND OF THE INVENTION

The invention relates to a method for loading and unloading long-distance transportation means and for temporarily storing a standardized cargo, e.g. container, interchangeable body structures for trucks, in an intermediate storage facility.

The transport of goods is increasingly implemented in standardized receptacles, such as containers, tanks, because storage as well as transport of goods can take place at optimum space utilization. Also the use of standardized hoists is possible for loading and unloading so that loading and unloading can be mechanized in an especially simple manner.

Long-distance transportation means, such as, for example, railway freight cars, trucks, ships, are high-value investments which should have shortest possible downtimes. In addition, efforts are underway to maintain shortest possible overall transportation times, whereby loading and unloading, in particular of rail-bound vehicles, which involve trains of a length of few hundredths of meters, may be extremely time-consuming. On one hand, marshalling of such trains in classification yards is labor-intensive, on the other hand, make up of a train can easily be replaced by respective loading of the train, when uniform rolling material is involved, provided a respective logistics is available, namely during unloading, temporary storage and loading of a train and also other long-distance transportation means.

WO 99/10258 discloses a storage facility for arrangement of storage goods of random dimension on cargo carriers. The loaded cargo carrier travels for storage to a storage rack having vertical and horizontal conveyor devices. The storage facility is supervised by a data processing unit. Further provided is the assembly of smaller loading units at job sites to a size that corresponds to a large loading unit. The multiplicity of vertically aligned transport lanes and vertical conveyor devices as well as in horizontal direction results in complex constructions which are prone to malfunction because of their multiplicity.

EP 0 599 841 B1 describes a method and a device for transshipping containers. The containers are transported by trucks to the loading station and are removed by a hoist for transfer to pallets that roll on rails. The cargo together with the rolling pallets is stored in a storage facility. Loading of a railway train is realized by placing the cargo next to the track in desired sequence before the train to be loaded arrives so that the loading time of the train can be significantly shortened as the goods being transported have been pre-positioned and there is only need for placement of the containers upon the rolling material. The storage facility is managed by a data processing system. Proposed is also the use of conveyor belts instead of rolling pallets. Involved here is a complicated construction which is thus prone to malfunction.

SUMMARY OF THE INVENTION

The invention is thus based on the object to provide a method for loading and unloading long-distance transportation means and for temporary storage, which method allows shorter times for loading and unloading of the long-distance transportation means and loading of and withdrawal from an intermediate storage facility, which method further does not require added means other than for lifting in order to load and unload containers, interchangeable body structures or to provide temporary storage but rather requires only substantially horizontally and vertically movable hoisting equipment. The method should further allow that its implementation requires only little space.

The method according to the invention for loading and unloading long-distance transportation means and for temporarily storing standardized cargo, e.g. containers, interchangeable body structures for highway trucks, in an intermediate storage facility, with the cargo being identified, in particular automatically, and lifted by a rail-guided hoist with gripper from a long-distance transportation means and transferred to a transfer zone, lowered and deposited, subsequently transferring the cargo automatically on rails to an at least single-level, especially multilevel, intermediate storage facility for automatic storage there, subsequently automatically withdrawing and transporting the cargo on rails to a predetermined location in the transfer zone for lowering and placement with the rail-guided hoist onto a rail-guided long-distance transportation means, essentially includes lifting the cargo in the transfer zone by a further rail-guided hoist with, especially same, grippers as the hoist, e.g. spreaders, combination spreaders, tongs, and automatically moving the cargo, optionally approximately horizontally, to the predetermined location in the intermediate storage facility, optionally under vertical conveyance, through intervention of a shiftable and/or telescopic arm of the further hoist into the intermediate storage facility and lowering and depositing the cargo there, whereupon the rail-bound long-distance transportation means is loaded by automatically moving the further hoist to a predetermined location of the intermediate storage facility, and lifting the cargo via the shiftable and/or telescopic arm and automatically withdrawing the cargo from the intermediate storage facility and automatically moving the cargo to a predetermined location in the transfer zone, and lowering and depositing the cargo in the latter, whereupon the cargo is lifted from the hoist and moved above the long-distance transportation means, and lowered and deposited there.

Compared to cargo of different dimensions, standardized cargo has the advantage that precisely suited spaces can be made available for long-distance transportation means as well as in an intermediate storage facility. As a consequence, the demand for space is considerably reduced. Further advantageous is the possibility to work with standardized hoists. In order to realize a rapid execution of loading and unloading as well temporary storage, it is necessary to identify the cargo before arrival at the freight station. This identification, implemented for example via bar codes, chips, video camera to make available the most important data such as departure location, destination location, sender, receiver, time of departure, time of arrival, can be automatically recorded in particular with a data processing system. The transport of the cargo by a rail-guided hoist to a transfer zone separates the unloading operation of a long-distance transportation means and the transport to an intermediate storage facility so that, for example, the number of hoists and further hoists can be suited to the varying time constraints for their individual actions. The transport in an at least single level, especially multilevel, intermediate storage facility can, on one hand, avoid a stacking of containers so that each container by itself can be withdrawn without rearrangement, and, on the other hand, a precisely positioned storage and thus also a reliable identification for withdrawal is possible. The term single-level intermediate storage facility is to be understood as relating to a storage facility in relation to the flat ground. The automated storage results in a marking of the storage location so that the cargo can again be automatically removed. When the cargo is lifted from a further rail-guided hoist and moved from there to the predetermined location in front of the intermediate storage facility and then moved by a shiftable and/or telescopic arm into the intermediate storage facility and deposited there, there is no need for an additional apparatus, such as rolling pallets, vertical conveyor, horizontal conveyor and the like but the provision of the movable further hoist is sufficient, whereby the same grippers as in the hoist can be used so that there is no need to equip the container or the like in additional regions with higher strength. The cargo can then be withdrawn again with the further hoist from this location in the intermediate storage facility and deposited on a predetermined site in the transfer zone. This predetermined site should already correspond to its position in the freight train because then there is only need for lifting the cargo with the hoist, movement thereof above the long-distance transportation means, and lowering there.

When swinging the cargo upon the hoist and/or further hoist about at least an approximately vertical axis, there is no need to align the long-distance transportation means, such as, for example, a highway truck or a freight train, in precise parallel relationship, when direct loading is desired. Such a swinging motion is also of particular importance for a small demand of space in the intermediate storage facility.

When swinging the cargo upon the hoist and/or further hoist about at least one approximately horizontal axis, the cargo can be aligned in parallel to the platform of the long-distance transportation means, on one hand, and also a respective adjustment in relation to the intermediate storage facility can be realized.

When moving the cargo from a long-distance transportation means along the rails of the rail-guided long-distance transportation means to the transfer zone and lowering the cargo there, a particularly short transport path is realized because the transfer zone is located between the rails of the rail-guided long-distance transportation means and the intermediate storage facility, whereby, moreover, this unloading process can also be executed when a loaded or only partially loaded railway train is involved because there is only a need to lift the cargo higher.

When the further hoist is moved along, in particular parallel to, the intermediate storage facility and the rails of the rail-guided long-distance transportation means, a particularly simple further hoist can be used because of the absence of different paths to the intermediate storage facility and the transfer zone for the cargo, and whereby, moreover, an automated storage and removal can be executed in a particularly simple manner.

When the cargo is withdrawn from the intermediate storage facility and pre-positioned in the transfer zone in correspondence to the desired disposition on the rail-guided long-distance transportation means, the loading period for loading the train can be significantly shortened, before arrival of the train, because it is only necessary to lift the cargo for a short horizontal displacement and then to lower it upon the long-distance transportation means.

When moving the cargo on the further hoist with its center of gravity above only one rail secured to the ground or in midsection of several ground rails, the overall construction of the hoist can be kept especially small so that energy consumption can be kept especially small for temporary storage and pre-positioning.

When inhibiting the movement of the cargo on the further hoist upon neighboring disposition of the hoist, a collision between the cargo on the hoist and the cargo on the further host can be easily prevented.

A precise positioning of the cargo in the intermediate storage facility can be realized by controlling the movement of the further hoist through position transmitters in the intermediate storage facility.

When controlling the movement of the hoist and the further hoist by position transmitters thereof, a simple continuous supervision can be implemented especially on the basis of the movement thereof.

BRIEF DESCRIPTION OF THE DRAWING

The invention will now be described in more detail with reference to the drawing.

The sole FIGURE shows a schematic illustration of individual stations of the method according to the invention.

DETAILED DESCRIPTION OF PREFERRED EMBODIMENTS

The drawing shows two long-distance transportation means, namely a highway truck 1 and a railway train 2 in substantial parallel relationship. Provided between the three-level high-rise storage rack 3 and the railway train 2 is a transfer zone 4 for receiving the cargo. Disposed above the railway train 2 is a hoist 5, namely a gantry crane, having a transverse rail 6 for movement of the trolley 7 with the spreader or gripper 8 from the highway truck via the railway train to the transfer zone 4. The hoist 5 can be moved along rails 9 which extend along the rails 10 of the railway train. Provided between the high-rise storage rack 3 and the transfer zone 4 is a further hoist 11 which can move along a rail 12. The hoist 11 further includes two telescopic arms 13 on which a not shown spreader can travel from the transfer zone 4 into the high-rise rack 3. The telescopic arm 13, which can additionally travel vertically along vertical supports 17, enables the not shown spreader to move from the transfer zone 4 to and into the respective bay 14, 15, 16 of the high-rise rack. The further hoist 11 includes two vertical supports 17 behind one another which are interconnected at the upper end by a cross member, on one hand, whereas the telescopic arms 13 are secured to a cross member which is movable upwards and downwards along the vertical supports. The arms may also be constructed as displaceable arms.

The cargo 18, namely a container, is shown in various positions.

Loading and unloading as well as temporarily storing cargo is carried out as follows.

The container 18, whether on the highway truck 1 or railway train 2, whereby several railway trains as well as several highway trucks may be disposed behind and next to one another, is identified either by a reader on the spreader 8 or also by hand and stored in a data processing system. Either the identification establishes already the destination location and the receiver, or this information must be inputted by hand. Taking into consideration the next train intended for the destination location, the container 18 is deposited either upon the railway train 2, when unloaded from the highway truck, or in the transfer zone 4. When removing the container 18 from the highway truck, the hoist 5 must be monitored by personnel. The spreader 8 of the hoist 5 and the unillustrated spreader of the further hoist 11 include sensors so as to facilitate the insertion of the holding pins in the respective receptacles. However, it should be taken into account that the highway truck not necessarily is positioned in parallel relationship to the rails 9 for the hoist 5 so that a rotation of the spreader 8 about a vertical axis may be required. When the container 18 is unevenly loaded and the container 18 is not arranged in parallel relationship to the ground, also an additional rotation about a horizontal axis may be required. After being lifted, the container is aligned into a position parallel to the rails 9 and generally horizontal. When intending to transport the container 18 into the intermediate storage facility, the further hoist 11 is operated by the data processing system to move in front of the container 18, to lower the spreader and to lift the container 18. The spreader 8 of the further hoist 11 is moved until the container 18 is positioned with its center of gravity above the rail 12. Subsequently taking place is a horizontal conveyance to a location predetermined by the data processing system whereupon the spreader of the further hoist 11 is optionally moved upwards, with respective markings being provided on the vertical supports for cooperation with sensors on the telescopic arm 13. Respective markings are provided on the bays for positioning of the further hoist 11 in front of the individual bays and cooperate with sensors which are provided on the vertical supports and on the telescopic arms. The container 18 is then moved into the respective bay and lowered.

Loading of a railway train involves a withdrawal of a selected container 18 from the high-rise storage rack by the further hoist 11, as controlled by the data system, wherein the data processing system controls the travel of the further hoist to the individual bay 14, 15, 16 as well as the movement pattern for the container, i.e. lifting, moving thereof with its center of gravity above the rail 12, then lowering and transport in lowered position to a predetermined location in the transfer zone 4 and lowering of the container in the transfer zone. The containers 18 are stored one after the other in the transfer zone 4 in accordance with logistics demands, for example, when individual railway cars should be disengaged, or when the specific demands of unloading devices at other railway stations should be taken into account. After arrival of the railway train, the containers 18 can be transported by the hoist 5 from the transfer zone or also from the highway truck onto the railway train. The movement of the cargo 18 on the further hoist 11 and the movement of the further hoist itself are inhibited when the hoist is in neighboring position. It is also conceivable, when several railway trains are positioned next to one another, to execute a transfer from one railway train to a further railway train. The number of hoists and further hoists as well as the length of the transfer zone 4 and the intermediate storage facility 3 depend on the intended loading times and the length of the long-distance transportation means to be loaded.

A precise control and/or regulation of the movement of the hoist and/or further hoist may be realized by providing thereon position transmitters which, e.g., identify the position relative to the intermediate storage facility, the transfer zone, the car of the railway train being loaded, the container, and/or detect the distance traveled.

What is claimed is:

1. A method for loading and unloading a long-distance transportation means and for temporarily storing cargo in an intermediate storage facility, comprising the steps of:
   a) identifying a cargo of a first long-distance transportation means;
   b) lifting the cargo by a first rail-guided hoist with gripper from the first long-distance transportation means;
   c) transferring the cargo to a predetermined site of a stationary transfer zone;
   d) lowering and depositing the cargo at the predetermined site of the transfer zone;
   e) lifting and automatically transferring the cargo from the predetermined site of the transfer zone by a shiftable and/or telescopic arm of a second rail-guided hoist to a predetermined location in an intermediate storage facility for storage;
   f) lowering and depositing the cargo in the intermediate storage facility;
   g) automatically moving the second hoist to a predetermined location of the intermediate storage facility;
   h) lifting and automatically withdrawing the cargo by the shiftable and/or telescopic arm of the second hoist from the predetermined location in the intermediate storage facility and automatically transferring the cargo to a predetermined location in the transfer zone;
   i) lowering and depositing the cargo in the transfer zone at a corresponding predetermined location on a rail-guided second long-distance transportation means; and
   j) lifting the cargo by the first hoist from the predetermined location in the transfer zone for placement onto the corresponding predetermined location on the rail-guided second long-distance transportation means.

2. The method of claim 1, wherein the identifying step is executed automatically.

3. The method of claim 1, wherein the step e) involves a transfer of the cargo to a single-level intermediate storage facility.

4. The method of claim 1, wherein the step e) involves a transfer of the cargo to a multi-level intermediate storage facility.

5. The method of claim 4, wherein the step e) involves a transfer of the cargo to a high-rise rack.

6. The method of claim 1, wherein the step e) includes a horizontal movement of the cargo by the second hoist.

7. The method of claim 6, wherein the step e) includes a vertical movement of the cargo by the second hoist by means of the shiftable and/or telescopic arm of the second hoist.

8. The method of claim 1, wherein the step c) includes a movement of the cargo directly by the first long-distance transportation means across rails of the second long-distance transportation means to the transfer zone.

9. The method of claim 1, wherein the step e) includes moving the second hoist substantially along the intermediate storage facility and the second long-distance transportation means.

10. The method of claim 1, wherein the step e) includes moving the second hoist in parallel relationship to the intermediate storage facility and the second long-distance transportation means.

11. The method of claim 1, wherein the step h) includes a positioning of the cargo in the transfer zone in accordance with a desired disposition upon the second long-distance transportation means.

12. The method of claim 1, wherein the second hoist is constructed such as to move the cargo with its center of gravity above a single rail mounted to the ground.

13. The method of claim 1, wherein a movement of the cargo by the second hoist and a movement of the second hoist itself are inhibited, when the first hoist is in neighboring disposition of the second hoist.

14. The method of claim 1, and further comprising the step of controlling a movement of the second hoist by position transmitters in front of and/or in the intermediate storage facility.

15. The method of claim 1, wherein the lifting steps b), e), h), j) are realized automatically.

16. The method of claim 1, wherein the lowering steps d), f) i) are realized automatically.

17. The method of claim 1, wherein the cargo is selected from the group consisting of standardized cargo, container, and interchangeable body structure for a highway truck.

* * * * *